United States Patent [19]

Agodoa

[11] Patent Number: 4,618,389

[45] Date of Patent: Oct. 21, 1986

[54] PROCESS FOR BONDING HEAT CURABLE SILICONE RUBBER TO A SUBSTRATE USING AN AQUEOUS PRIMER COMPOSITION

[75] Inventor: Michael K. Agodoa, Toledo, Ohio

[73] Assignee: SWS Silicones Corporation, Adrian, Mich.

[21] Appl. No.: 691,357

[22] Filed: Jan. 14, 1985

Related U.S. Application Data

[63] Continuation of Ser. No. 491,158, May 4, 1983, abandoned.

[51] Int. Cl.$^4$ ............................................... C09J 5/02
[52] U.S. Cl. ............................ 156/307.5; 106/287.13; 106/287.14; 106/287.15; 106/287.16; 156/326; 427/407.1; 428/447
[58] Field of Search .......................... 156/307.5, 326; 427/407.1; 106/287.14, 287.15, 287.16, 287.13; 428/447

[56] References Cited

U.S. PATENT DOCUMENTS

| | | | |
|---|---|---|---|
| 3,022,196 | 2/1962 | Jenkins et al. | 106/287.16 |
| 3,318,717 | 5/1967 | Simpson | 106/287.15 |
| 4,106,948 | 8/1978 | Cooper et al. | 106/287.15 |
| 4,243,718 | 1/1981 | Murai et al. | 428/447 |

*Primary Examiner*—John J. Gallagher

[57] ABSTRACT

A process for bonding heat curable silicone rubber to a variety of substrates using an aqueous primer composition containing an alkenyltrihydrocarbonoxysilane and an aqueous miscible solvent selected from the group consisting of aliphatic alcohols, glycol ethers, ketones and esters.

5 Claims, No Drawings

PROCESS FOR BONDING HEAT CURABLE SILICONE RUBBER TO A SUBSTRATE USING AN AQUEOUS PRIMER COMPOSITION

This is a continuation of application Ser. No. 491,158 filed May 4, 1983, now abandoned.

The present invention relates to a process for bonding heat curable silicone rubber to a substrate and more particularly to a process for bonding heat curable silicone rubber to a variety of substrates using an aqueous primer composition.

BACKGROUND OF THE INVENTION

Silicone rubber has been bonded to a variety of substrates using various primer compositions. For example, U.S. Pat. No. 3,498,824 to Chadha discloses a process for bonding silicone rubber to a substrate using a primer composition containing an organic solvent and mono- and di-hydrocarbonoxy substituted acyloxysilanes. U.S. Pat. No. 2,979,420 to Harper discloses a process for bonding room temperature vulcanizable silicone rubber to a variety of substrates using a primer composition containing monohydrocarbon triacyloxysilanes and partial hydrolyzates thereof. The patentee further discloses that hydrocarbonoxy silanes of the formula $R_nSi(OR')_{4-n}$ have been found to be inoperative as a primer for bonding room temperature silicone rubber to a variety of materials.

Also, U.S. Pat. No. 3,377,309 to Harper describes a method for bonding room temperature vulcanizable silicone rubber to a variety of substrates which comprises coating a substrate surface with a composition containing a phenyl-containing siloxane resin, an alkylsilicate, a chlorosilane and the balance being a non-halogenated solvent; drying the coated substrate and thereafter applying a room temperature vulcanizable silicone rubber to the dried substrate.

Most of the processes employed heretofore for bonding curable silicone rubber to a substrate utilize compositions containing organic solvents. These organic solvents are generally considered to be hazardous in the workplace as well as to the employees. In addition, the costs of monitoring the environment and removing the solvent are substantial. Also, primer compositions which contain organic solvents are generally highly flammable and are to be avoided, if possible. Therefore, the use of aqueous primers which are substantially free of highly inflammable and hazardous organic solvents is desirable.

Water soluble silane compositions have been described in U.S. Pat. No. 2,965,515 to Jellinek for treating fibrous glass material to make laminated products from resins and glass cloth. These water soluble silane compositions consist of vinylalkoxysilanes of the formula

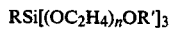

where R is vinyl, R' is a methyl or ethyl hydrocarbon radical and n is at least one and not greater than about 7.

Surprisingly, applicants have found that heat curable silicone rubber can be bonded to a variety of substrates using a primer composition containing an aqueous solution of an alkenyltrihydrocarbonoxysilane containing an organic solvent which is miscible with water. This is totally unexpected in view of the teachings of U.S. Pat. No. 2,979,420 to Harper which teaches that hydrocarbonoxy silanes are inoperative as primers for bonding room temperature vulcanizable silicone rubber to a variety of substrates.

It is, therefore an object of this invention to provide a process for bonding heat curable silicone rubber to a variety of substrates. Another object of this invention is to provide a process for bonding heat curable silicone rubber to a variety of substrates using an aqueous primer composition. Still another object of the present invention is to provide an aqueous primer composition for bonding heat curable silicone rubber to a variety of substrates. A further object of the present invention is to provide an aqueous primer composition which is stable after long-term storage.

SUMMARY OF THE INVENTION

The foregoing objects and others which will become apparent from the following description are accomplished in accordance with this invention, generally speaking, by providing a process for bonding a heat curable silicone rubber to a variety of substrates which comprises coating a substrate with an aqueous composition containing an alkenyltrihydrocarbonoxysilane and an organic solvent which is miscible with water, drying the coated substrate, applying a heat curable silicone rubber composition to the dried substrate and thereafter curing the silicone rubber composition at an elevated temperature.

DESCRIPTION OF THE INVENTION

The alkenyltrihydrocarbonoxysilanes which are employed in the process of this invention may be represented by the formula

where R is an alkenyl radical having from 2 to 6 carbon atoms, R' is a monovalent hydrocarbon radical having from 1 to 10 carbon atoms, R'' is a divalent hydrocarbon radical having from 1 to 6 carbon atoms and n is a number of from 0 to 4.

Examples of suitable alkenyl radicals represented by R are vinyl, allyl, 1-butenyl, 2-butenyl, 1-isobutenyl, 2-isobutenyl, 1-sec-butenyl, 2-sec-butenyl, 1-pentenyl, 2-pentenyl, 3-pentenyl, 1-hexenyl, 2-hexenyl, 3-hexenyl, 3,3-dimethyl-1-butenyl, 2,3-dimethyl-1-butenyl, 2,3-dimethyl-2-butenyl and the 1-methyl-1-ethyl-2 propenyl radical.

Examples of monovalent hydrocarbon radicals represented by R' are alkyl radicals such as the methyl, ethyl, propyl, isopropyl, butyl, pentyl, hexyl, octyl and decyl radicals and aryl radicals such as the phenyl radical.

Suitable examples of divalent hydrocarbon radicals represented by R'' are alkylene radicals such as methylene, ethylene, propylene, tetramethylene and hexamethylene radicals.

Suitable examples of alkenyltrihydrocarbonoxysilanes which may be employed in the process of this invention are vinyltrimethoxysilane, vinyltriethoxysilane, vinyltributoxysilane, vinyltrioctoxysilane, vinyltridecoxysilane, vinyltriphenoxysilane, allyltriethoxysilane, allyltributoxysilane, allyltrioctoxysilane, butenyltriethoxysilane and hexenyltrimethoxysilane.

Examples of other alkenyltrihydrocarbonoxysilanes which may be employed in the process of this invention are alkenyltris-hydrocarbonoxy-hydrocarbonoxy silanes such as vinyltris-2-methoxyethoxy silane, vinyltris-2-ethoxyethoxy silane, vinyltris-ethoxymethoxy silane, vinyltris-3-methoxypropoxy silane, vinyltris-6-methoxyhexoxy silane, allyltrisethoxymethoxy silane, allyl tris-4-methoxybutoxy silane, butenyltris-2-ethoxyethoxy silane, butenyltris-3-methoxypropoxy silane, hexenyltris-4-propoxybutoxy silane, allyltris-6-ethoxyhexoxy silane, allyltris-2-octoxyethoxy silane, allyltris-3-decoxypropoxy silane and vinyltris-methoxydiethyleneglycoxy silane.

In preparing the primer compositions used in the process of this invention, the alkenyltrihydrocarbonoxy silanes or the alkenyltris-hydrocarbonoxy-hydrocarbonoxy silanes are dissolved in water and an organic solvent which is miscible with the water. It is preferred that the organic solvent have a boiling point below about 180° C. in order that it will evaporate rapidly.

Examples of suitable solvents are aliphatic alcohols having from 1 to 4 carbon atoms, such as methanol, ethanol, propanol, isopropanol and t-butanol. Other solvents which may be employed are glycol ethers such as ethylene glycol monomethyl ether, ethylene glycol monoethyl ether, ethylene glycol monobutylether, ethylene glycol dimethylether; ketones such as acetone and 2-butanone, and esters such as methyl acetate, ethyl acetate and the like.

When the primer composition is used immediately after preparation, then it is not essential that an acid be added to adjust the pH below 7. However, when the primer is to be stored for long periods of time, then it is preferred that sufficient acid be added to adjust the pH below about 7 and more preferably from about 3 to 6. It has been found that the primer composition is stable for longer periods of time when the pH is below about 7, than when the pH is 7 or above.

Any acid which lowers the pH may be employed in the primer compositions. Examples of suitable inorganic acids are hydrochloric acid and nitric acid. Examples of suitable monobasic and dibasic organic acids are formic acid, acetic acid, butyric acid, oxalic acid, fumaric acid, crotonic acid, acrylic acid, maleic acid, as well as metal chlorides, nitrates and sulfates, where the metal is selected from Group III and IV of the Periodic Table. Other organic acids which may be employed are toluene sulfonic acid and benzoic acid.

The amount of organic solvent present in the primer composition should not exceed about 50 percent by weight based on the weight of the primer composition. Preferably the amount of organic solvent should range from about 5 to 30 percent by weight and more preferably from about 10 to 25 percent by weight based on the weight of the primer composition.

The amount of water present in the primer composition may range from about 89 to 20 percent by weight of water and more preferably from about 82 to 55 percent by weight of water based on the weight of the primer composition, i.e., the solvent, water and alkenyltrihydrocarbonoxysilane.

In most applications the primer composition is applied as a solution containing from about 0.5 to 20 percent by weight and more preferably from 1 to 15 percent by weight of an alkenyltrihydrocarbonoxysilane based on the weight of the primer composition. When heat curable silicone rubber is to be bonded to fabrics, solutions containing from 0.5 to 10 percent by weight of an alkenyltrihydrocarbonoxysilane, based on the weight of the primer composition, have been employed with excellent results.

Other additives, such as rust inhibitors and surface-active agents may be incorporated in the primer compositions of this invention.

The primer composition may be applied to a large number of substrates, including for example, cold-rolled steel, stainless steel, copper, brass, aluminum, titanium, plastic, glass, wood, porcelain, glass cloth, and fabrics composed of cotton, polyester fibers or fibers derived from long-chain polyamides and etched polytetrafluoroethylene.

The primer composition may be applied in any suitable manner including brushing, dipping, and spraying. Either smooth or rough surfaces can be effectively primed. In the case of metals the surface should be thoroughly cleaned of oxide, grease or other contaminates using the appropriate methods, such as vapor degreasing, acid cleaning, light sanding followed by wiping with a degreasing solvent or sand or grit blasting. Acid-cleaned steel should be dried immediately after the water rinse to prevent rusting.

Before the application of the heat curable silicone rubber, the primed surface should be allowed to dry completely to assure complete evaporation of the solvent and thorough activation of the primer compound. If the drying process is accelerated through the use of a hot air oven, the primed substrate, upon removal from the oven, should be allowed to cool before the heat curable silicone rubber is applied.

The heat curable silicone rubber is applied over the primer in an unvulcanized state and then cured with heat and pressure, if desired. Fabrics generally do not require special treatment before priming. Both greige goods and fabrics that have been heat treated, heat set and scoured may be processed according to the invention. The curable silicone rubber composition may be applied to the primed fabric as by calendering or knife or roller coating.

The heat curable silicone rubber compositions are well known in the art and methods for preparing such materials are old and widely described in the art. These heat curable silicone rubber compositions contain organopolysiloxanes having recurring structural units of the general formula $$R_x^1 SiO_{\frac{4-x}{2}},$$

where $R_1$ is a monovalent hydrocarbon radical or a substituted monovalent hydrocarbon radical having from 1 to 18 carbon atoms and x is a number of from 1.9 to 2.2.

Various curing agents may be added to the organopolysiloxane compositions to effect rapid conversion of the compositions to an elastomeric state. Organic peroxides are particularly effective. Among such peroxides may be mentioned, for example, benzoyl peroxide, t-butyl perbenzoate, bis(2,4-dichlorobenzoyl) peroxide, dicumyl peroxide, dialkyl peroxides, such as di-t-butyl peroxide, etc. These curing agents may be present in amounts ranging from about 0.1 to as high as 4 to 8 percent by weight or even more based on the weight of the organopolysiloxane polymers.

Other heat curable organopolysiloxane compositions which may be bonded to a variety of substrates with the primer compositions of this invention are organopolysiloxanes which are cross-linked by the addition of silicon-bonded hydrogen to silicon-bonded aliphatic multiple bonds.

Diorganopolysiloxanes which may be employed in these compositions are those represented by the formula:

$$R^1_3SiO(SiR^1_2O)_mSiR^1_3$$

wherein $R^1$ is the same as above, in which an average of at least two SiC-bonded aliphatically unsaturated groups are present per molecule and m is an integer having a value of at least 10.

Although this is generally not shown in the formula illustrated above, the siloxane chain of the aforementioned diorganopolysiloxanes may contain siloxane units in addition to the diorganosiloxane units ($SiR_2^1O$). Examples of such other siloxane units, which are generally present only as impurities, are those corresponding to the formulas $R^1SiO_{3/2}$, $R^1_3SiO_{\frac{1}{2}}$ and $SiO_{4/2}$, where $R^1$ is the same as above. It is, however, preferred that such other siloxane units be present in an amount less than 1 mole percent.

Monovalent hydrocarbon radicals represented by $R^1$ are alkyl radicals such as methyl, ethyl, propyl, butyl, hexyl, octyl, decyl and octadecyl radicals; aryl radicals such as the phenyl and naphthyl radicals; alkenyl radicals such as the vinyl and allyl radicals; alkaryl radicals such as the tolyl, xylyl and ethylphenyl radicals; aralkyl radicals such as the benzyl, phenylethyl and phenylpropyl radicals and cycloaliphatic hydrocarbon radicals, such as the cyclohexyl and cycloheptyl radicals.

Examples of substituted monovalent hydrocarbon radicals within the scope of $R^1$ are halogenated hydrocarbon radicals such as chloromethyl, alpha-chloroethyl, beta-chloroethyl, chlorophenyl, dibromophenyl, trifluoromethylphenyl, trifluoromethylpropyl radicals as well as cyanoalkyl radicals such as, for example, cyanomethyl, beta-cyanoethyl, beta-cyanopropyl and cyanobutyl radicals.

It is also preferred that a majority of the $R^1$ radicals in the curable organopolysiloxane be lower alkyl radicals, for example, methyl radicals. It is usually preferred that the organopolysiloxanes from which the curable silicone rubber compositions are prepared contain an average of from about 1.98 to about 2.2 organic groups, for instance, methyl groups or methylphenyl groups, etc., per silicon atom and that more than 98 percent of the silicon atoms of the polysiloxane contain two silicon-bonded organic groups, for instance, alkyl groups or a mixture of alkyl and aryl groups, etc., per silicon atom. Included specifically in this formula are the dimethylpolysiloxanes, methylphenylpolysiloxanes, methylvinylpolysiloxanes, and copolymers of such units, such as copolymers containing dimethyl-, diphenyl-, and phenylmethylsiloxane units and copolymers containing phenylmethyl-,dimethyl-and vinylmethylsiloxane units.

Because of their availability, it is preferred that at least 80 percent of the $R^1$ radicals be methyl radicals.

Preferred diorganopolysiloxanes are those having trimethylsiloxy or vinyldimethylsiloxy groups as terminal units and contain from 0.01 to 5 mole percent of methylvinylsiloxane units. More preferably the diorganopolysiloxanes are those containing from 0.1 to 2 mole percent of methylvinylsiloxane units and the remaining diorganosiloxane units are dimethylsiloxane units.

When the compositions are to be cross-linked by the addition of silicon-bonded hydrogen to a silicon-bonded aliphatic multiple bond, it is essential that the diorganopolysiloxane which constitutes the base of the composition have at least two alkenyl radicals for each diorganopolysiloxane molecule.

The viscosity of the diorganopolysiloxanes used in the compositions which are crosslinked by the addition of silicon-bonded hydrogen to a silicon-bonded aliphatic multiple bond is preferably at least 100 mPa.s at 25° C. and more preferably at least $10^5$ mPa.s at 25° C.

When the compositions are to be cross-linked by the addition of silicon-bonded hydrogen to a silicon-bonded aliphatic multiple bond, then the composition must contain in addition to the diorganopolysiloxane containing alkenyl radicals, at least one organosilicon compound having at least 3 silicon-bonded hydrogen atoms per molecule and a catalyst which promotes the addition of silicon-bonded hydrogen to the silicon-bonded aliphatic multiple bonds.

The organosilicon compounds containing at least 3 silicon-bonded hydrogen atoms per molecule are generally organopolysiloxanes, especially methylhydrogenpolysiloxanes.

The organosilicon compounds may contain units represented by the formula $$R_a^2 SiO_{\frac{4-a}{2}}$$

where $R^2$ represents hydrogen or is the same as $R^1$, in which at least 2 and preferably 3 silicon-bonded hydrogen atoms are present per molecule and a is 1, 2 or 3. Preferred compounds are those having $R^2HSiO$-units, $R_2^2SiO$—and $R_3^2SiO_{\frac{1}{2}}$—units in which a silicon-bonded hydrogen atom is present for each 3 to 100 silicon atoms in the compounds and have a viscosity of from 10 to 50,000 mPa.s at 25° C.

The organosilicon compounds having at least 3 silicon-bonded hydrogen atoms per molecule are preferably used in an amount of from 0.5 to 20 percent by weight, based on the weight of the diorganopolysiloxane containing alkenyl radicals.

Examples of catalysts which promote the addition of silicon-bonded hydrogen to aliphatic multiple bonds are metallic and finely dispersed platinum, ruthenium, rhodium, palladium and iridium. These metals may be dispersed on carriers, such as carbon black, silicon dioxide, aluminum oxide or activated carbon. Furthermore, it is possible to use compounds or complexes of these metals, such as $PtCl_4$, $H_2PtCl_6.6H_2O$, $Na_2PtCl_4.4H_2O$, platinum-olefin complexes, platinum-alcohol complexes, platinumalcoholate complexes, platinum-ether complexes, platinum-aldehyde complexes, platinum-ketone complexes, ammonium platinum complexes, platinum-vinyl-siloxane complexes, especially platinum-divinyltetramethyldisiloxane complexes with or without any detectable, inorganically bonded halogen, trimethylenedipyridine platinum dichloride; as well as iron, nickel and cobalt carbonyls.

When one of the above metals, compounds and/or complexes of said metals is used as a catalyst to promote the addition of silicon-bonded hydrogen to aliphatic multiple bonds, then such catalysts are preferably used in an amount of from 0.5 to 500 ppm (parts per million by weight), calculated as the metallic elements and based on the weight of the diorganopolysiloxane containing alkenyl radicals.

Finely divided fillers such as reinforcing and nonreinforcing fillers may be incorporated in the curable organopolysiloxane compositions. The amount of fillers used in combination with the organopolysiloxane polymers may be varied within wide limits, for instance, from about 10 to 300 percent by weight of fillers based on the weight of the organopolysiloxane polymers. The exact amount of fillers used will depend upon such factors as, for instance, the application for which the curable organopolysiloxane compositions are intended, the type of fillers employed, the density of the fillers, the type of curable organopolysiloxanes employed, etc. Obviously, mixtures of reinforcing fillers with nonreinforcing fillers may be employed.

Examples of suitable fillers which may be used are clay, hydrated calcium silicate, zinc sulfide, silica aerogel, fumed silica, precipitated silica, barium titanate, glass fiber, floc, iron oxide, bentonite, zinc oxide, nickelous oxide, magnesium oxide, carbon black, micronized graphite, micronized slate, micronized mica, celite, lead oxide, titanium dioxide, calcium carbonate and talc. Those having surface areas above 50 square meters per gram are generally classed as reinforcing fillers.

The heat curable organopolysiloxane compositions may be modified by the addition of other substances such as dyes, pigments, flame retardants, stabilizing agents and plasticizers such as siloxane fluids.

Generally, the curable silicone rubber compositions are prepared by adding the reinforcing and/or nonreinforcing fillers, curing agents and other additives such as dyes, pigments and flame retardants to the organopolysiloxane compositions during the milling operation.

The resultant curable organopolysiloxane compositions are applied to a previously primed substrate and then heated to a temperature of from 100° to 200° C. for varying periods of time, for example, from about 5 minutes up to about 30 minutes or more. Molding pressures of from about 10 to 2000 psi. or more may be advantageously employed. Generally, organopolysiloxane compositions which utilize peroxide curing agents are preferably given a post-cure treatment at elevated temperatures, for example, from about 1 to 24 hours or more and at temperatures of from 150° to 250° C. to bring out the optimum properties of the cured silicone rubber.

This invention can be used to produce a wide range of products, including silicone rubber coated substrates which may be used as dampers in sonar devices and as protective coatings where silicone rubber is applied to protective sheets and films. In addition, porous substrates such as cellulosic materials may be coated with silicone rubber to render them water-repellent.

The various embodiments of this invention are further illustrated by the following examples, in which all parts are by weight unless otherwise specified.

EXAMPLE 1

(a) A primer solution is prepared by adding 60 parts of vinyltris-2-methoxyethoxy silane to a flask containing 1176 parts of t-butanol and 1764 parts of water and then agitating the resultant solution for 30 minutes at 25° C. The solution is stored in a closed container for 30 days and then applied to previously cleaned and degreased cold-rolled steel substrates and thereafter dried at room temperature for about one hour.

(b) A heat curable silicone rubber composition containing 100 parts of a polydimethylsiloxane gum containing 0.2 mole percent of methylvinylsiloxane units, 42 parts of fumed silica (Cab-O-Sil), 8 parts of a hydroxyl terminated polydimethylsiloxane (50 cs. at 25° C.), 1.5 parts of bis-(2,4-dichlorobenzoyl) peroxide is milled for one hour until it acquires a smooth uniform consistency. It is then applied to the coated substrates and press-cured for 15 minutes at 115° C. at 1000 psi. After cooling to room temperature the adhesion is determined in accordance with the procedure described in ASTM D-429, Method B, 90° Adhesion Test. The results are shown in Table I.

(c) The stability of the primer composition is determined by applying a sample of the primer composition prepared in (a) above after various periods of storage to previously cleaned and degreased cold-rolled steel substrates and thereafter dried at room temperature for one hour.

The heat curable silicone rubber prepared in (b) above is applied to the coated substrate and press-cured for 15 minutes at 115° C. at 1000 psi. After cooling to room temperature, the adhesion is determined in accordance with the procedure described in ASTM D-429, Method B, 90° Adhesion Test. The results are shown in Table II.

EXAMPLE 2

(a) A primer solution is prepared by adding with agitation 60 parts of vinyltris-2-methoxyethoxy silane to a flask containing 1158 parts of t-butanol, 1764 parts of water and 22 parts of acetic acid. The solution is agitated for an additional 30 minutes at 25° C. and stored in a closed container for 30 days at room temperature. The solution is then applied to previously cleaned and degreased cold-rolled steel substrates and dried at room temperature for about one hour.

(b) A heat curable silicone rubber composition prepared in accordance with the procedure described in Example 1(b) is applied to the coated substrates. The results of the adhesion test are shown in Table I.

(c) The stability of the primer composition prepared in accordance with the procedure described in Example 2(a) is determined after varying periods of storage in accordance with the procedure described in Example 1(c). The results are shown in Table II.

EXAMPLE 3

(a) A primer solution is prepared by mixing 60 parts of vinyltris-2-methoxyethoxy silane with 1176 parts of t-butanol in a flask at room temperature and then stored in a closed container for 30 days at room temperature. At the end of the 30-day storage period, 100 parts of the primer solution are mixed with 140 parts of water and then applied to cleaned and degreased cold-rolled steel substrates and then dried at 50° C. for 30 minutes.

(b) The heat curable silicone rubber composition prepared in accordance with Example 1(b) is applied to the coated substrates. The results of the adhesion test are shown in Table I.

(c) The stability of the primer composition prepared in accordance with the procedure described in Example 3(a) is determined after varying periods of storage in accordance with the procedure described in 1(c). The results are shown in Table II.

EXAMPLE 4

(a) A primer solution is prepared by mixing 60 parts of vinyltris-2-methoxyethoxy silane with 1158 parts of t-butanol and 22 parts of acetic acid and then stored in a closed container for 30 days at room temperature. At the end of the 30-day storage period, 100 parts of the primer solution are mixed with 140 parts of water, and applied to cleaned and degreased cold-rolled substrates and then dried at 50° C. for 30 minutes.

(b) The heat curable silicone rubber composition of Example 1(b) is applied to the coated substrates in accordance with the procedure of Example 1(b). The results of the adhesion test are shown in Table I.

(c) The stability of the primer composition prepared in accordance with the procedure described in Example 4(a) is determined after varying periods of storage at room temperature by mixing 100 parts of the primer composition with 140 parts of water and then applying the solution to cleaned and degreased cold-rolled steel substrates. The coated substrates are dried at 50° C. for 30 minutes. The heat curable silicone rubber of example 1(b) is applied to the substrates in accordance with the procedure described in Example 1(b). The results of the adhesion test are shown in Table II.

EXAMPLE 5

(a) A primer solution is prepared by adding with agitation 60 parts of vinyltris-2-methoxyethoxy silane to a flask containing 2940 parts of water. The solution is agitated for an additional 30 minutes at 25° C. and then applied to previously cleaned and degreased cold-rolled steel substrates and dried at 50° C. for 30 minutes.

(b) The heat curable silicone rubber composition prepared in accordance with the procedure described in Example 1(b) is applied to the coated substrates. The results of the adhesion test are shown in Table I.

EXAMPLE 6

(a) A primer composition prepared in accordance with Example 2(a) is applied to previously cleaned and degreased cold-rolled steel substrates and dried at 50° C. for about 30 minutes.

(b) A silicone rubber composition is prepared by mixing 100 parts of a trimethylsiloxy endblocked diorganopolysiloxane which consists of 99.86 mole percent of dimethylsiloxane units and 0.14 mole percent of methylvinylsiloxane units and having a plasticity value of about 105 with sufficient chloroplatinic acid-isopropanol solution to provide 15 ppm of platinum and 31 parts of pyrogenically prepared silicon dioxide having a surface area of 200 m²/g. The mixture is mixed for 30 minutes and then 1.6 parts of methylhydrogen polysiloxane having a silicon to hydrogen ratio of 1:1 and a viscosity of 5 mPa.s at 25° C. are added. The mixture is applied to the coated substrates and then heated to 170° C. for 15 minutes at about 2000 psi. After cooling to room temperature the adhesion is determined in accordance with the procedure described in ASTM D-429, Method B, 90° Adhesion Test. The results are shown in Table I.

EXAMPLE 7

(a) A primer solution is prepared in accordance with the procedure described in Example 5(a), except that 60 parts of vinyltriethoxysilane is substituted for the vinyltris-2-methoxyethoxy silane. The resultant solution is applied to previously cleaned and degreased cold-rolled steel substrates and dried at 50° C. for 30 minutes.

(b) The heat curable silicone rubber composition prepared in accordance with Example 1(b) is applied to the coated substrates and cured. The results of the adhesion test are shown in Table I.

EXAMPLE 8

(a) A primer solution is prepared in accordance with the procedure described in Example 2(a), except that 60 parts of vinyltriethoxysilane is substituted for the 60 parts of vinyltris-2-methoxyethoxy silane. Cleaned and degreased cold-rolled steel substrates are coated with the primer solution and dried at 50° C. for 30 minutes.

(b) The heat curable silicone rubber composition prepared in accordance with Example 1(b) is applied to the coated substrates and cured. The results are shown in Table I.

EXAMPLE 9

(a) A primer solution is prepared by adding with agitation 60 parts of vinyltriethoxysilane to a flask containing 1800 parts of water and 1140 parts of t-butanol. The solution is agitated for an additional 30 minutes at 25° C. and then applied to previously cleaned and degreased cold-rolled steel substrates and dried at 50° C. for 30 minutes.

(b) The heat curable silicone rubber composition prepared in accordance with the procedure described in Example 1(b) is applied to the coated substrates and cured. The results of the adhesion test are shown in Table I.

EXAMPLE 10

(a) A primer solution is prepared by adding with agitation 60 parts of vinyltriethoxysilane to a flask containing 2940 parts of water and 22 parts of acetic acid. The solution is agitated for an additional 30 minutes at 25° C. and then applied to previously cleaned and degreased cold-rolled steel substrates and dried at 50° C. for 30 minutes.

(b) The heat curable silicone rubber composition prepared in accordance with the procedure described in Example 1(b) is applied to the coated substrates and cured. The results of the adhesion test are shown in Table I.

TABLE I

| Example No. | Silane | | Water (percent) | t-butanol (percent) | Acetic Acid (percent) | 90° Adhesion Test lbs/inch width |
|---|---|---|---|---|---|---|
| | | (percent) | | | | |
| | | | | | | (30 days storage) |
| 1 | A | 2 | 58.8 | 39.2 | — | 44.2 |
| 2 | A | 2 | 58.8 | 38.5 | 0.7 | 42.8 |
| 3 | A | 2 | 58.3 | 39.6 | — | 39.1 |
| 4 | A | 2 | 58.3 | 39.6 | | 34.3 |
| 5 | A | 2 | 98 | — | — | 41.8 |
| 6 | A | 2 | 59.2 | 38.8 | 0.7 | 42.6(a) |
| | | | | | | 0 days storage |
| 7 | B | 2 | 98 | — | — | 24.5 |
| 8 | B | 2 | 58.8 | 38.5 | 0.7 | 45.9(a) |
| 9 | B | 2 | 60 | 38 | — | 8.4 |

TABLE I-continued

| Example No. | Silane (percent) | Water (percent) | t-butanol (percent) | Acetic Acid (percent) | 90° Adhesion Test lbs/inch width |
|---|---|---|---|---|---|
| 10 | B | 2 | 97.3 | — | 0.7 | 42.6 |

A = Vinyltris-2-methoxyethoxy silane
B = Vinyltriethoxysilane
(a) = Cohesive Failure (1 sample)

COMPARISON EXAMPLE V₁

Cleaned and degreased cold-rolled steel substrates are coated with the heat curable silicone rubber prepared in accordance with Example 1(b). The coated substrates are press cured for 15 minutes at 115° C. at 1000 psi. After cooling to room temperature the adhesion is determined in accordance with the 90° adhesion test. No adhesion is observed.

TABLE II

| | 90° Adhesion Test (Pounds/inch of width) | | | |
|---|---|---|---|---|
| | Shelf-Aging (Days) | | | |
| Example No. | 14 | 30 | 60 | 90 |
| 1 | 23.0 | 44.2 | 38.7 | 41.7 |
| 2 | — | 42.8 | 33.7 | — |
| 3 | 20.8 | 39.1(a) | 28.0 | 53(b) |
| 4 | — | 34.2 | 32.7(a) | 43(b) |

(a) = Cohesive Failure (1 sample)
(b) = Cohesive Failure (2 samples)

EXAMPLE 11

(a) A primer solution is prepared by adding with agitation 60 parts of vinyltris-2-methoxyethoxy silane to a flask containing 750 parts of t-butanol, 300 parts of ethylene glycol monobutyl ether, 1872 parts of water and 22 parts of acetic acid. The solution is agitated for an additional 30 minutes at 25° C. and then stored in a closed container for 90 days at room temperature. The solution is then applied to previously cleaned and degreased cold-rolled steel substrates and dried at a temperature of 50° C. for 30 minutes.

(b) The heat curable silicone rubber composition prepared in accordance with the procedure described in Example 1(b) is applied to the coated substrates and cured. Good adhesion of the silicone rubber to the substrates is observed.

EXAMPLE 12

(a) A primer solution is prepared by mixing 2 parts of vinyltris-2-methoxyethoxy silane with 35 parts of ethylene glycol monobutyl ether, 62.4 parts of water and sufficient acetic acid to adjust the primer solution to a pH of 5. The primer solution is then applied to cleaned and degreased cold-rolled steel substrates and dried at 50° C. for about 30 minutes.

(b) A heat curable silicone rubber composition prepared in accordance with Example 1(b) is applied to the coated substrates and press cured at 115° C. for 15 minutes at 1000 psi. After cooling to room temperature, the adhesion is determined in accordance with the procedure described in ASTM D-429, Method B, 90° Adhesion Test. The results are shown in Table III.

EXAMPLE 13

(a) A primer composition is prepared in accordance with the procedure of Example 12(a), except that 0.1 part of a surfactant (available from 3M Company as Fluorad) is added to the primer composition.

(b) A heat curable silicone rubber composition prepared in accordance with Example 1(b) is applied to the coated substrates and cured. The results of the adhesion tests and the wettability are shown in Table III.

TABLE III

| Example No. | Wettability | Adhesion |
|---|---|---|
| 12 | Fair | 35.3(b) |
| 13 | Good | 32.3(c) |

(b) = Cohesive failure (2 samples).
(c) = Cohesive failure (3 samples).

EXAMPLE 14

When the following alkenyltris-hydrocarbonoxy hydrocarbonoxy silanes are substituted for the vinyltris-2-methoxyethoxy silane of Example 1(a), good adhesion of the silicone rubber to the substrates are observed.

(a) allyltris-methoxyethoxy silane
(b) allyltris-3-ethoxypropoxy silane
(c) vinyltris-3-propoxymethoxy silane
(d) butenyltris-4-methoxybutoxy silane
(e) vinyltris-4-ethoxybutoxy silane
(f) vinyltris-6-methoxyhexoxy silane
(g) hexenyltris-2-methoxyethoxy silane
(h) vinyltris-2-ethoxyethoxy silane.

What is claimed is:

1. An improved method for bonding a heat curable silicone rubber composition to a substrate which comprises applying a heat curable silicone rubber composition to a substrate and thereafter curing the silicone rubber composition at an elevated temperature, the improvement which comprises coating the substrate prior to the application of the silicone rubber composition with an aqueous primer composition consisting essentially of from 0.5 to 20 percent by weight based on the weight of the primer composition of an 1 alkenyltrihydrocarbonoxysilane having the formula $$RSi[(OR'')_nOR']_3$$

where R is an alkenyl radical having from 2 to 6 carbon atoms, R' is a monovalent hydrocarbon radical having from 1 to 10 carbon atoms, R" is a divalent hydrocarbon radical having from 1 to 6 carbon atoms and n is a number of from 0 to 4, an aqueous miscible solvent which is present in an amount of from 10 to 25 percent by weight based on the weight of the aqueous primer composition and having a boiling point up to 180° C., water in an amount of from 55 to 82 percent based on the weight of the aqueous primer composition and an organic acid in an amount sufficient to provide a pH below 7, and thereafter drying the coated substrate.

2. The improved method of claim 1, wherein n is equal to 0.

3. The improved method of claim 1, wherein the aqueous miscible solvent is selected from aliphatic alcohols having from 1 to 4 carbon atoms, glycol ethers, ketones and esters.

4. The improved method of claim 1, wherein the heat curable silicone rubber composition contains an organopolysiloxane gum, filler and a peroxide curing agent.

5. The improved method of claim 1, wherein the silicone rubber composition contains an organopolysiloxane having at least two SiC-bonded aliphatically unsaturated groups per molecule, an organosilicon compound having at least three Si-bonded hydrogen atoms per molecule and a catalyst which promotes the addition of the Si-bonded hydrogen to the SiC-bonded aliphatically unsaturated groups.

* * * * *